United States Patent [19]

Schorfheide et al.

[11] Patent Number: 5,306,681
[45] Date of Patent: Apr. 26, 1994

[54] METHOD FOR RECOVERY OR MAINTAINING THE ACTIVITY OF HYDROISOMERIZATION CATALYSTS

[75] Inventors: James J. Schorfheide, Baton Rouge, La.; Biddanda U. Achia, Clearwater, Canada

[73] Assignee: Exxon Research and Engineering Company, Florham Park, N.J.

[21] Appl. No.: 37,218

[22] Filed: Mar. 26, 1993

Related U.S. Application Data

[62] Division of Ser. No. 799,810, Nov. 29, 1991, Pat. No. 5,212,128.

[51] Int. Cl.⁵ .................. B01J 20/34; C10G 73/00
[52] U.S. Cl. ........................ 502/22; 502/30; 502/31; 502/53; 208/24
[58] Field of Search ............ 502/31, 30, 53, 22; 208/24

[56] References Cited

U.S. PATENT DOCUMENTS

| | | | |
|---|---|---|---|
| 3,092,668 | 6/1963 | Bruson | 502/31 |
| 3,308,052 | 3/1967 | Ireland et al. | 208/27 |
| 3,375,293 | 3/1968 | Breckoff et al. | 502/31 |
| 3,486,993 | 12/1969 | Egan et al. | 208/89 |
| 4,164,481 | 8/1979 | Ma et al. | 252/412 |
| 4,560,670 | 12/1985 | Pelrine | 502/26 |
| 4,612,293 | 9/1986 | Johnson | 502/28 |
| 4,892,646 | 1/1990 | Venkat et al. | 502/30 |
| 4,992,159 | 2/1991 | Cody et al. | 208/89 |
| 5,050,299 | 10/1991 | Cody et al. | 208/27 |

FOREIGN PATENT DOCUMENTS

| | | | |
|---|---|---|---|
| 1271035 | 12/1986 | Japan | B01J 38 |
| 2282645 | 12/1987 | Japan | B01J 23 |
| 9101804 | 2/1991 | PCT Int'l Appl. | B01J 21/20 |
| 2108861 | 5/1983 | United Kingdom | B01J 23/94 |
| 2222531 | 3/1990 | United Kingdom | B01J 23/90 |

Primary Examiner—Anthony Mc Farlane
Assistant Examiner—Nhat D. Phan
Attorney, Agent, or Firm—Joseph J. Allocca

[57] ABSTRACT

The isomerization activity of hydroisomerization catalyst is recovered by subjecting the catalyst to a wash using light aromatic solvents at elevated temperature, e.g. toluene at 300° C. This hot aromatic solvent wash may be preceded by a hot hydrogen containing gas strip. Catalyst activity can be maintained by the continuous or periodic addition of light aromatic solvent or light aromatic containing materials to the feeds sent to the isomerization catalyst.

8 Claims, 2 Drawing Sheets

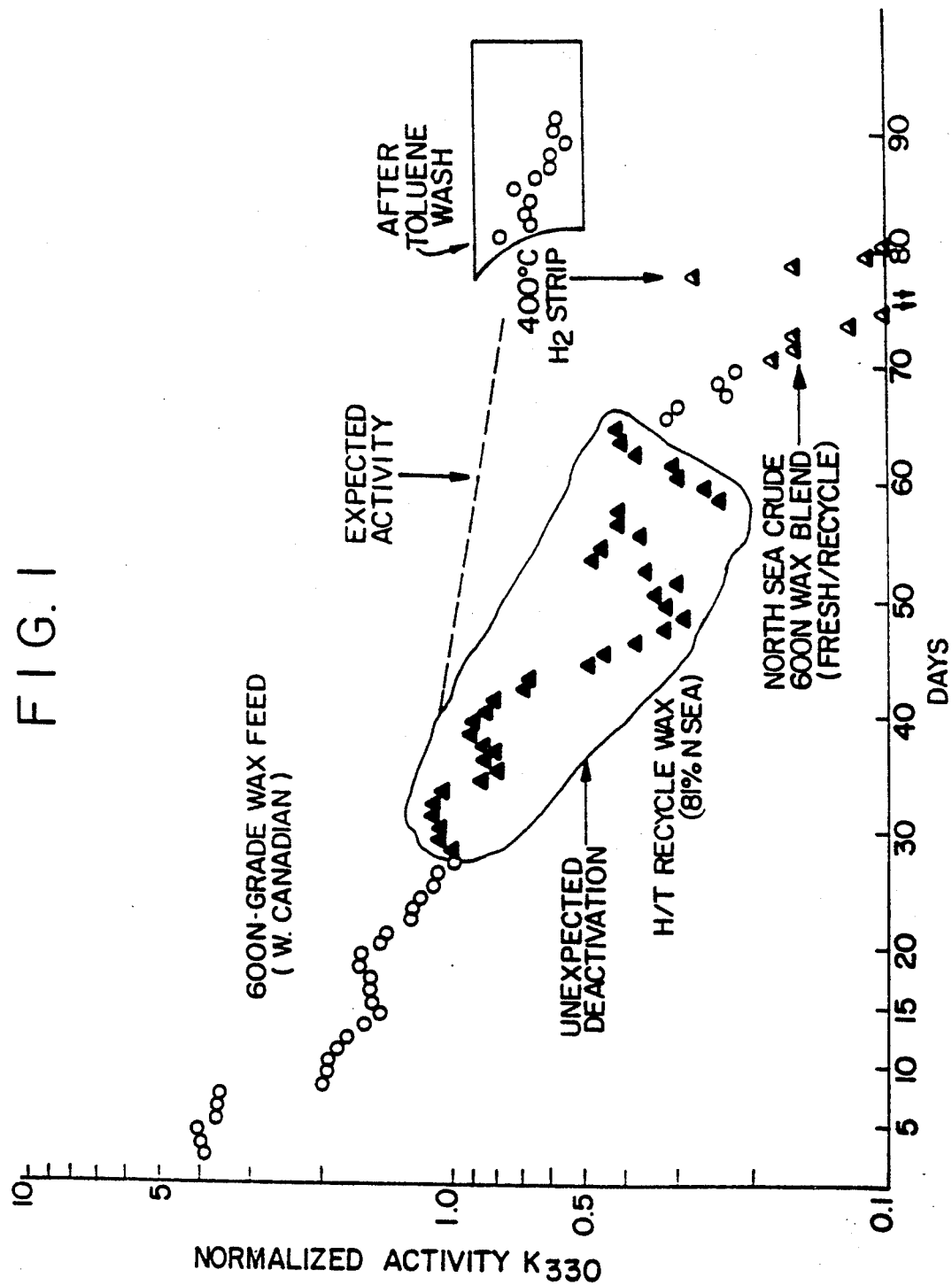

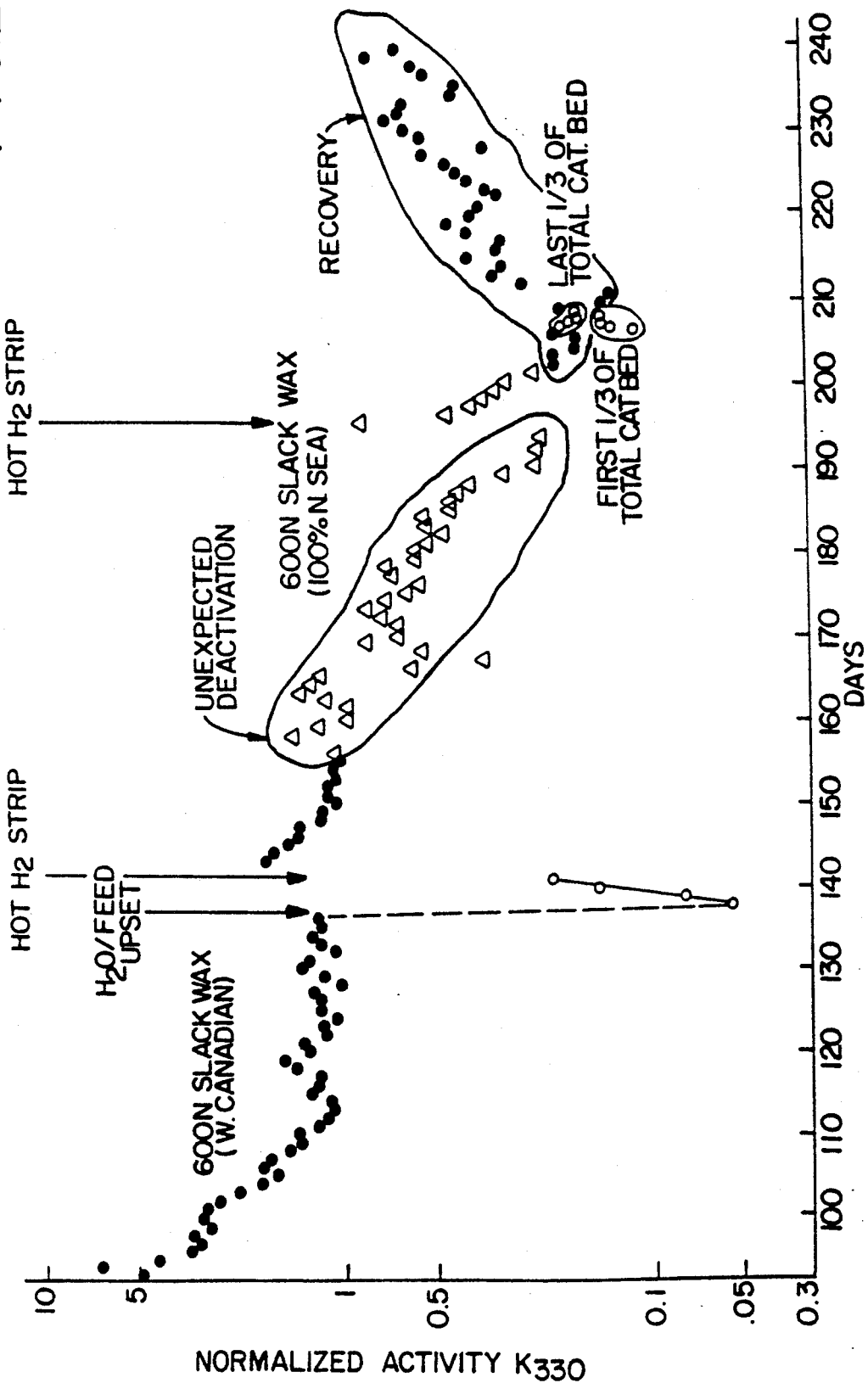

METHOD FOR RECOVERY OR MAINTAINING THE ACTIVITY OF HYDROISOMERIZATION CATALYSTS

This is a division of application Ser. No. 799,810, filed Nov. 29, 1991, now U.S. Pat. No. 5,212,128.

BRIEF DESCRIPTION OF THE INVENTION

Isomerization catalysts used for the isomerization of wax to lube oil or the isomerization upgrading of feeds such as waxy distillates and raffinates and which are deactivated during such use can have their lost activity restored by subjecting the deactivated catalyst to a wash using light aromatic solvents at elevated temperatures, e.g. toluene at 300° C. in the liquid phase. This hot, light aromatic solvent wash may be preceded by a hot hydrogen or hydrogen-containing gas strip. Catalyst activity can be maintained in fresh or reactivated catalysts by the continuous or periodic addition of light aromatic solvent or light aromatic-containing material, e.g. light aromatic-containing oil to the wax hydrocarbon feeds sent to the isomerization catalyst in the isomerization reactor.

BACKGROUND OF THE INVENTION

Catalyst regeneration using solvent washes is known to the industry.

Japanese patent publication J6 1271035 teaches the regeneration of used catalyst in the hydrogenation of coal tar pitch by washing with aromatic solvent, drying with inert gas and washing with water. The washing uses as the aromatic solvent a middle oil, washing oil, anthracene oil, methyl naphthalene oil, quinoline oil, etc. at a temperature of 100 to 450° C. in the presence of hydrogen at 50 to 250 kg/cm². Any solvent adsorbed by the catalyst is removed by an inert gas strip, e.g. Nitrogen at 100 to 400° C. at a gas hourly space velocity of 100–5000. The water washing removes water soluble alkali metals from the catalyst. The catalysts which are reactivated include hydrogenation active metals supported on porous inorganic oxides, e.g. alpha alumina, silica, magnesia, zeolite, kaolin. Hydrogenation active metals are copper, vanadium, molybdenum, tungsten, cobalt, nickel and iron, etc.

Japanese patent publication J6 2282645 teaches the regeneration of supported palladium hydrogenation catalysts by washing with an aromatic hydrocarbon. The catalyst is used to hydrogenate dienes. The aromatic solvent used to wash the catalyst is preferably benzene, toluene, xylenes, mesitylene, ethyl benzene, o-, m-, and p- di ethyl benzene, cumene, o-, m-, and p- di isopropylbenzene, tert-butyl benzene and/or amylbenzene, etc.

BRIEF DESCRIPTION OF THE FIGURES

FIG. 1 graphically presents activity versus time and shows the initial activity, deactivation activity and the reactivation of a deactivated isomerization catalyst by use of the light aromatics wash process of the present invention.

FIG. 2 graphically presents activity versus time-on-stream and shows the initial activity, deactivation activity, and the reactivation of a deactivated isomerization catalyst by exposure of the deactivated catalyst to a slack wax of lower and lighter aromatics content.

DESCRIPTION OF THE INVENTION

Isomerization of wax to lube or specialty oils or raffinate isomerization to improve viscosity index employing catalysts, particularly catalysts comprising noble Group VIII metal on halogenated refractory metal oxide more particularly platinum or palladium on fluorided alumina or fluorided substantially alumina base, in which the catalysts have become deactivated during such use, can be reactivated by washing the catalyst in a light aromatic solvent, or light aromatics-containing oil at elevated temperature. For the purposes of this specification and the appended claims typical aromatic solvents are meant to include pure or refinery grade light aromatic solvent streams (refinery grade meaning mixtures of said light aromatics with other non-aromatic hydrocarbons such as paraffins or naphthenes) and include benzene and single-ring aromatics bearing one or more alkyl substitutes which may be the same or different $C_1$–$C_5$ hydrocarbyl groups, such as benzene, toluene, the xylenes, o-, m-, p- di-ethyl benzene, ethyl benzene, o-, m-, p- di isopropyl benzene, tert-butyl benzene, etc. and mixtures thereof, while light aromatics-containing oils include refinery streams such as reformate or virgin or catalytically cracked naphthas.

This washing is conducted at elevated temperatures, 100°–350° C., preferably 200°–300° C.

The washing can comprise simply soaking the deactivated catalyst one or more times in the hot aromatic solvent, rinsing the catalyst one or more times in the hot light aromatic solvent, or combinations thereof. The temperatures used in these multiple soaking and washing/rinsing sequences need not be the same, provided the temperature in each case is elevated, i.e. about 100° C. or higher.

The washing, be it soaking, rinsing or both is preferably performed in the presence of hydrogen or hydrogen-containing gas. The amount of hydrogen and its pressure are not critical criterion. The amount of hydrogen and its pressure believed adequate are, for example, at least about 50–100 SCF $H_2$/bbl and at least 50 psig.

Treatment may be carried out as a continuous, once-through washing, fill-and-soak downflow (trickle bed operation) or upflow (flooded flow operation); the direction of flow may be either the same or opposite to the normal direction of process flow. The washing, however, is conducted with the light aromatics in the liquid phase. Thus the combination of temperature and pressure used is such so as to insure that at least part of the aromatic hydrocarbon wash is in the liquid phase.

It may also be possible to prevent catalyst deactivation by the introduction of light aromatics or light aromatics-containing material to the feed sent to the isomerization zone. This addition can be practiced on either a continuous or periodic basis. The preferred mode of operation, however, would be to wash the catalyst only when necessary to recover lost activity.

Treatment may be preceded by a stripping, preferably downflow, with hot hydrogen-containing gas at 100 to 400° C. This stripping removes oxygenated compounds, adsorbed water and adhering liquid hydrocarbons such as paraffins.

As an alternative, the deactivated catalyst can be exposed under isomerization conditions to wax of lower or lighter, lower-boiling aromatic content than the wax which initially caused the deactivation, to slowly regain lost activity. This procedure can also be employed for catalysts deactivated during raffinate hydrogenation.

The wax used in the reactivation step preferably has about 6 wt% or less total aromatics. The aromatics which are present should be predominantly the light, single-ring aromatics and not polynuclear aromatics (PNAs). The wax would, of course, be hydrotreated to remove or reduce N and S compounds to very low levels (typically <1 wppm). While this procedure recovers lost activity, the recovery is slow and, therefore, considerable product yield is lost during the slow reactivation. The deactivated catalyst can be stripped using hydrogen or hydrogen-containing gas at elevated temperature (in the range 300 to 400° C.) prior to the introduction of the low aromatic hydrocarbon content wax. While this may be beneficial, it is not required.

In general, these procedures can be applied to any isomerization catalyst typically comprising Group VI and/or Group VIII metals on halogenated refractory metal oxides, preferably Group VIII metals on halogenated refractory metal oxides, more preferably Group VIII metals on fluorided refractory metal oxide support, preferably alumina or a support predominantly alumina, most preferably Pt or Pd on fluorinated gamma alumina. Preferred catalysts useful in isomerization are described in detail in U.S. Pat. No. 4,900,707, U.S. Pat. No. 4,959,337, U.S. Pat. No. 4,906,601. Isomerization processes using these catalysts are described in detail in U.S. Pat. No. 4,929,795, U.S. Pat. No. 4,937,399, U.S. Pat. No. 4,923,588, U.S. Pat. No. 4,992,159.

A preferred catalyst is described in U.S. Ser. No. 699,101 filed May 10, 1991 now U.S. Pat. No. 5,182,248. The catalyst contains a catalytically active metal component selected from the group consisting of Group VIB and Group VIII metals, and mixtures thereof, preferably Group VIII metals, and mixtures thereof, more preferably noble Group VIII metals and mixtures thereof, most preferably platinum which is the catalytically active metal component and is present in the range of about 0.01 to 5.0 wt %, and a fluorine content in the range of about 0.01 to about 10.0. The catalyst employs a refractory metal oxide support material, one preferably predominantly (i.e., at least 50 wt %) alumina, most preferably completely alumina, e.g., gamma or eta alumina. The finished catalyst has a porosity, expressed in terms of pore volume, of at least about 0.50 cc/gram and a surface area such that when the porosity is multiplied by the surface area (m$^2$/gram) the product obtained is at least about 107, preferably at least about 110, more preferably at least about 115, most preferably at least about 120.

The isomerization is performed, typically under conditions including a temperature of 300 to 400° C., 500 to 3000 psi H$_2$, 1000–10,000 SCF H$_2$/bbl and 0.1–10.0 LHSV, preferably 320°–385° C., 1000–1500 psi H$_2$ and 1–2 v/v/hr.

A preferred wax isomerization process is described in U.S. Ser. No. 522,275 now U.S. Pat. No. 5,059,299 which teaches that slack waxes and synthetic wax are isomerized and processed into high viscosity index (130+VI) and very low pour point (−21° C. and lower) lube base stock oils and blending stocks by the process comprising the steps of hydrotreating the wax, if necessary, to remove heteroatom and polynuclear aromatic compounds and/or deoiling the wax, if necessary, to an oil content between about 5–20% oil, isomerizing the wax over a Group VI-Group VIII on halogenated refractory metal oxide support catalyst, said isomerization being conducted to a level of conversion such that 15–35% unconverted wax remains in the 330° C.+, preferably the 370° C.+, fraction sent to the dewaxer. The total isomerate from the isomerization unit is fractionated into a lube oil fraction boiling at 330° C.+, preferably 370° C.+. This oil fraction is solvent dewaxed preferably using MEK/MIBK at 20/80 volume ratio and unconverted wax is recycled to the isomerization unit. Operating in this manner permits one to obtain isomerate oil of very high VI possessing low pour points.

In a preferred embodiment described in U.S. Ser. No. 283,659 now U.S. Pat. No. 5,158,761, the hydroisomerate is rendered daylight stable by the process of treating the hydroisomerate total liquid product with a Group VIII metal on halogenated refractory metal oxide catalyst under mild conditions including a temperature in the range 170°–270° C., a pressure in the range of 300 to 1500 psi H$_2$, 0.25 to 10 v/v/hr and 500 to 10,000 SCF H$_2$/bbl.

Examples

Example 1

A Pt/F/Al$_2$O$_3$ catalyst of 1/16" extrudates (0.6 wt % Pt 5–7 wt % F) in a 200 cc low mass velocity (110 lb/hr/ft$^2$) upflow unit was run on a hydrotreated 600N slack wax (5.5 wt % total aromatics, <1 wppm nitrogen and sulfur) derived from a Western Canadian crude. Feed was then switched to a hydrotreated wax recycled from an earlier isomerization run (recycle wax) on hydrotreated 600N slack wax derived from 81% North Sea crude (8.3 wt % total aromatics by HPLC on fresh wax feed, <1 wppm nitrogen and sulfur), the balance being 19% Mideast crude (10% Arab Light, 9% Kirkuk). This feed deactivated the catalyst. Switching to a 600N North Sea blend wax (3/1 fresh (100% N. Sea)/recycle (81% N. Sea), 2–4 wppm nitrogen) appeared to accelerate the deactivation. A 400° C. strip with pure H$_2$ failed to reactivate the catalyst.

The deactivated catalyst was reactivated in the following way.

The catalyst was given another downflow H$_2$ strip at 400° C. to remove light hydrocarbons and any adhering liquid film, then cooled to ambient temperature.

In the absence of air, the reactor was filled with reagent grade toluene and pressured to 300 psig H$_2$. Toluene was introduced directly to the reactor vessel—the toluene was not fed through the normal feed lines, pumps, etc.

The reactor was heated to 300° C., pressured to 1000 psig H$_2$, and allowed to soak for 4 hours. After cooling to <100° C., the wash solution (in thin film, a deep red color; in bulk, a murky dark brown) was drained.

This 4-hour toluene soak at 300° C. was repeated 2 additional times. This was followed by filling-and-draining the reactor with fresh toluene at 100° C.; this washing was done 17 times. Coloration of wash solvent from the reactor never fully disappeared, even after wash #17.

The isomerization run was resumed, on the low aromatics content 600 N slack wax derived from Western Canadian crude. Isomerization conditions were constant during all runs and comprised a pressure of 1000 psig, 1.0 LHSV, 2500 SCF H$_2$/bbl. Temperature was varied to maintain a constant product yield.

The catalyst was evaluated for activity (expressed as K$_{330}$, a first-order kinetic rate constant for the disappearance of wax, relative to a reference temperature of 330° C.) and was found to exhibit an immediate return to a level of activity in line with that which had been expected, based on previous experience, had the catalyst not experienced deactivation, see FIG. 1.

Example 1 illustrates catalyst reactivation by washing with a single-ring aromatic solvent.

Example 2

A Pt/F/Al$_2$O$_3$ catalyst (see Example 1) was deactivated in a 3600 cc, high mass velocity (2000 lb/hr/ft$^2$) downflow unit when isomerization was performed on a wax feed comprising hydrotreated 600N slack wax derived from 100% North Sea crude. Isomerization was performed at 1000 psig, 1.0 LHSV, 2500 SCF H$_2$/bbl. Deactivation was evidenced by the necessity of increasing the temperature about 0.9° F./day (18° C./37 days) in order to maintain constant wax conversion. A downflow hydrogen strip at 400 C failed to restore the lost performance. The catalyst was switched to a 600N slack wax of lower aromatic content derived from a Western Canadian crude source and the catalyst regained its lost activity, evidenced by the reduction of the temperature required to maintain constant wax conversion, at a rate of about 15° C. over a period of 35 days. The feed which deactivated the catalyst had an aromatics content of about 8.3 wt %; the feed which restored activity had an aromatics content of about 5.5 wt %.

High Performance Liquid Chromatography (HPLC) inspections of the full boiling range material feeds are presented in Table 1.

TABLE 1

| wt. % | 600 N Western Canadian | 600 N 100% North Sea |
|---|---|---|
| 1-ring aromatics | 3.4 | 5.7 |
| 2-ring aromatics | 0.0 | 1.0 |
| 3-ring aromatics | 0.0 | 0.3 |
| 4-ring aromatics | 0.0 | 0.3 |
| Polar (V. heavy aromatics) | 2.1 | 1.0 |
| TOTAL | 5.5 | 8.3 |

The 10% bottoms cuts of the two feeds were also evaluated by HPLC and are presented in Table 2.

TABLE 2

| wt. % | 600 N Western Canadian | 600 N 100% North Sea (556° C.+) |
|---|---|---|
| 1-ring aromatics | 7.1 | 8.2 |
| 2-ring aromatics | 3.6 | 6.0 |
| 3-ring aromatics | 0.0 | 2.1 |
| 4-ring aromatics | 0.0 | 1.8 |
| Polar | 1.1 | 2.5 |
| (V. heavy aromatics) | | |

Example 2 illustrates gradual recovery of catalyst activity on a wax feed of lower aromatic content (even though of similar whole feed aromatics distributions), showing that it is not just the presence of heavy aromatics which causes activity loss (as in Example 1), but also the quantity and distribution of aromatics in feed. This example also illustrates the alternate catalyst regeneration procedure of switching a deactivated catalyst to a slack wax of lower and lighter aromatics content (by HPLC). This is graphically presented in FIG. 2.

What is claimed is:

1. A method for recovering the activity of deactivated isomerization catalysts comprising Group VI and/or VIII metal on halogenated refractory metal oxide used for the isomerization of feeds selected from wax, waxy distillates and waxy raffinates, comprising washing the deactivated catalyst one or more times with a light aromatic solvent selected from the group consisting of benzene and single-ring aromatics bearing one or more alkyl substituents which are the same or different and which contain C$_1$–C$_5$ hydrocarbyl groups or with a light aromatic containing oil selected from reformate, virgin or catalytically cracked naphthas, at least a part of the light aromatic solvent or light aromatic containing oil being in the liquid state, and at an elevated temperature in the range of 100 to 350° C.

2. The method of claim 1 wherein the light aromatic solvent is a single-ring aromatic and the temperature is in the range 200 to 300° C.

3. The method of claim 1 wherein the light aromatic solvent is selected from the group consisting of benzene, toluene, the xylenes, o-, m-, p- di- ethyl benzene, ethyl benzene, o-, m-, p- di- isopropyl benzene, tert-butyl benzene and mixtures thereof.

4. The method of claim 2 wherein the light aromatic solvent is selected from the group consisting of benzene, toluene, the xylenes, o-, m-, p- di- ethyl benzene, ethyl benzene, o-, m-, p- di- isopropyl benzene, tert-butyl benzene and mixtures thereof.

5. The method of claim 1, 2, 3 or 4 wherein the aromatic solvent wash is performed in the presence of hydrogen or hydrogen-containing gas.

6. The method of claim 5 wherein the hydrogen or hydrogen-containing gas is at a pressure of at least 50 psi.

7. The method of claim 1, 2, 3 or 4 wherein the aromatic solvent wash is preceded by hydrogen stripping conducted at 100 to 400° C.

8. The method of claim 5 wherein the aromatic solvent wash is preceded by hydrogen stripping conducted at 300 to 400° C.

* * * * *